US012792045B2

(12) United States Patent
Standiford et al.

(10) Patent No.: US 12,792,045 B2
(45) Date of Patent: Nov. 10, 2026

(54) REMOTELY CONTROLLED VEHICLE WITH SAFETY STANDOFF DISTANCE LIMITER

(71) Applicant: Textron Systems Corporation, Hunt Valley, MD (US)

(72) Inventors: Matthew Thomas Standiford, Towson, MD (US); John Paul Hupfer, Parkton, MD (US); Bradley S. Galloway, Seven Valleys, PA (US); Aaron Russell Grieb, Spring Grove, PA (US)

(73) Assignee: Textron Systems Corporation, Hunt Valley, MD (US)

( * ) Notice: Subject to any disclaimer, the term of this patent is extended or adjusted under 35 U.S.C. 154(b) by 204 days.

(21) Appl. No.: 18/658,515

(22) Filed: May 8, 2024

(65) Prior Publication Data

US 2024/0377833 A1 Nov. 14, 2024

Related U.S. Application Data

(60) Provisional application No. 63/465,933, filed on May 12, 2023.

(51) Int. Cl.
*G05D 1/227* (2024.01)
*B60R 16/023* (2006.01)
(Continued)

(52) U.S. Cl.
CPC ......... *G05D 1/227* (2024.01); *B60R 16/0231* (2013.01); *B60T 7/12* (2013.01); *G05D 2111/30* (2024.01); *G05D 2111/54* (2024.01)

(58) Field of Classification Search
CPC ............... G05D 1/227; G05D 2111/30; G05D 2111/54; B60R 16/0231; B60T 7/12
See application file for complete search history.

(56) References Cited

U.S. PATENT DOCUMENTS 10,394,233 B2 8/2019 Young et al.
10,440,880 B2 10/2019 Wyatt et al.
(Continued)

FOREIGN PATENT DOCUMENTS

DE 19842926 A1 4/2000
GB 2421062 A 6/2006
JP 2016503740 A 2/2016

OTHER PUBLICATIONS

PCT/US2024/028707, Notification of Transmittal of the International Search Report and the Written Opinion of the International Searching Authority, or the Declaration dated Sep. 20, 2024, 14 pages.

*Primary Examiner* — Nga X Nguyen
(74) *Attorney, Agent, or Firm* — BainwoodHuang

(57) ABSTRACT

A remotely controlled vehicle (RCV) includes a vehicle propulsion system constructed and arranged to move the RCV. The RCV further includes a vehicle control computer coupled with the vehicle propulsion system. The vehicle control computer is constructed and arranged to operate the vehicle propulsion system. The RCV further includes electronic safety equipment coupled with the vehicle propulsion system. The electronic safety equipment is constructed and arranged to perform a method which includes receiving a set of speed signals indicating a current speed of the RCV. The method further includes performing a comparison operation which compares the current speed of the RCV, as indicated by the set of speed signals, to a predefined maximum speed. The method further includes triggering an emergency vehicle stop in response to a result of the comparison operation indicating that the current speed of the RCV exceeds the predefined maximum speed by a predefined amount.

19 Claims, 5 Drawing Sheets

(51) Int. Cl.

| | |
|---|---|
| ***B60T 7/12*** | (2006.01) |
| ***G05D 111/30*** | (2024.01) |
| ***G05D 111/50*** | (2024.01) |

(56) References Cited

U.S. PATENT DOCUMENTS

| | | | | |
|---|---|---|---|---|
| 10,800,257 | B2 | 10/2020 | Kirchmair | |
| 11,305,758 | B2 | 4/2022 | Ross et al. | |
| 11,345,267 | B2 | 5/2022 | Howe et al. | |
| 11,731,697 | B2 | 8/2023 | Howe et al. | |
| 11,827,295 | B2 | 11/2023 | Tripp et al. | |
| 11,969,877 | B1 | 4/2024 | Foley et al. | |
| 12,071,059 | B2 | 8/2024 | Tripp | |
| 2007/0034392 | A1 | 2/2007 | Pohlman, Jr. et al. | |
| 2014/0110183 | A1 | 4/2014 | Rudakevych et al. | |
| 2018/0339683 | A1 | 11/2018 | Ninoyu et al. | |
| 2020/0361428 | A1* | 11/2020 | Blumentritt | B60T 7/12 |
| 2021/0179037 | A1* | 6/2021 | Heller | B60W 10/10 |
| 2021/0197815 | A1* | 7/2021 | Pitzer | B60W 30/143 |
| 2022/0144313 | A1 | 5/2022 | Hiemer et al. | |
| 2022/0266862 | A1 | 8/2022 | Bybee et al. | |
| 2022/0289199 | A1 | 9/2022 | Sun | |
| 2022/0381177 | A1 | 12/2022 | Lewis et al. | |
| 2023/0040437 | A1 | 2/2023 | Boehm et al. | |
| 2024/0025417 | A1* | 1/2024 | Onitsuka | B60T 7/12 |
| 2024/0123954 | A1* | 4/2024 | Li | B60T 17/221 |

* cited by examiner

REMOTELY CONTROLLED VEHICLE WITH SAFETY STANDOFF DISTANCE LIMITER

CROSS REFERENCE TO RELATED APPLICATIONS

This application is a regular utility application based on earlier-filed U.S. Application No. 63/465,933 filed on May 12, 2023, entitled “Remotely Controlled Vehicle With Safety Standoff Distance Limiter”, the contents and teachings of which are hereby incorporated by reference in their entirety.

BACKGROUND

A robotic combat vehicle does not require a human operator to be onboard. Rather, the human operator may control the robotic combat vehicle from another location (e.g., from within a different vehicle which is escorted by the robotic combat vehicle).

SUMMARY

Robotic combat vehicles generally have associated safety standoff distances, i.e., minimum distances to be maintained by personnel for safety during operation. For example, if a particular robotic combat vehicle can travel 100 feet in the time it takes the human operator to execute an emergency stop, then the safety standoff distance will generally be some distance greater than 100 feet to protect personnel from being struck by the vehicle in the event of an emergency situation with lost or reduced control of the vehicle.

For high-performance (or heavy) robotic combat vehicles having relatively high top speeds and high acceleration (e.g., ability to accelerate to 30 MPH in a few seconds), it may be necessary to establish correspondingly high safety standoff distances to ensure safety under worst-case conditions, e.g., a failure resulting in runaway drive motors between the time that an emergency stop condition is recognized and acted on by the human operator and when the robotic combat vehicle finally stops in response to an emergency stop signal. A large safety standoff distance may be acceptable under normal operating conditions because high speed operations are generally conducted at a safe distance from all personnel in the area.

However, in other operating situations involving much lower operating speeds, such large standoff distances may be onerous and even unenforceable as a practical matter. As an example, a robotic combat vehicle may be in a low-speed loading, maneuvering or parking operation in close quarters, such as in a motor pool or being loaded to/from a transport, where it is impractical to require such high standoff distances of all personnel in the area.

Improved techniques are directed to employing electronic safety equipment for a vehicle. The electronic safety equipment, which may be referred to at times as, or including, a safety standoff distance limiter (or SSDL) may enforce a low maximum speed in certain operating modes, reducing the safety standoff distance accordingly during low-speed operation and avoiding the practical difficulties of worst-case safety standoff distances as discussed above. In some arrangements, the SSDL allows a maximum speed configured by a physical switch on the vehicle or by a remote command from a remote device. The SSDL causes an emergency stop of the vehicle if the maximum speed is exceeded. The SSDL is preferably designed to fail in a safe (E-Stop) state.

One embodiment is directed to a remotely controlled vehicle which includes a vehicle propulsion system constructed and arranged to move the remotely controlled vehicle. The remotely controlled vehicle further includes a vehicle control computer coupled with the vehicle propulsion system. The vehicle control computer is constructed and arranged to operate the vehicle propulsion system. The remotely controlled vehicle further includes electronic safety equipment coupled with the vehicle propulsion system. The electronic safety equipment is constructed and arranged to perform a method which includes receiving a set of speed signals indicating a current speed of the remotely controlled vehicle. The method further includes performing a comparison operation which compares the current speed of the remotely controlled vehicle, as indicated by the set of speed signals, to a predefined maximum speed. The method further includes triggering an emergency vehicle stop in response to a result of the comparison operation indicating that the current speed of the remotely controlled vehicle exceeds the predefined maximum speed by a predefined amount.

Another embodiment is directed to electronic safety equipment to control a vehicle. The electronic safety equipment includes memory and processing circuitry coupled with the memory. The memory stores instructions which, when carried out by the processing circuitry, cause the processing circuitry to perform a method of:

(A) receiving a set of speed signals indicating a current speed of the vehicle, (B) performing a comparison operation which compares the current speed of the vehicle, as indicated by the set of speed signals, to a predefined maximum speed, and (C) triggering an emergency vehicle stop in response to a result of the comparison operation indicating that the current speed of the vehicle exceeds the predefined maximum speed by a predefined amount.

Yet another embodiment is directed to a method of controlling a vehicle. The method includes:

(A) receiving a set of speed signals indicating a current speed of the vehicle;

(B) performing a comparison operation which compares the current speed of the vehicle, as indicated by the set of speed signals, to a predefined maximum speed; and (C) triggering an emergency vehicle stop in response to a result of the comparison operation indicating that the current speed of the vehicle exceeds the predefined maximum speed by a predefined amount.

In some arrangements, the vehicle propulsion system includes a set of electric motors constructed and arranged to move the vehicle in response to a set of drive signals. Additionally, the vehicle control computer is constructed and arranged to provide the set of drive signals to the set of electric motors to move the vehicle. Furthermore, the vehicle further comprises a set of sensors. Also, receiving the set of speed signals indicating the current speed of the vehicle includes sensing the set of speed signals from the set of sensors while the vehicle control computer provides the set of drive signals to the set of electric motors to move the vehicle.

In some arrangements, the vehicle propulsion system further includes a set of ground engagement members, and a gear box which couples the set of electric motors with the set of ground engagement members. Additionally, the set of sensors includes a set of encoders enclosed within the gear box. Furthermore, sensing the set of speed signals from the set of sensors includes acquiring, as at least a portion of the set of speed signals, a set of encoder signals from the set of encoders.

In some arrangements, the vehicle includes a set of brakes which couples with the set of ground engagement members. Additionally, triggering the emergency vehicle stop includes engaging the set of brakes to stop the vehicle.

In some arrangements, wherein the set of brakes includes a set of failsafe brake assemblies constructed and arranged to (i) release to allow the set of ground engagements members to move in response to a set of brake release signals provided through a set of relays and (ii) engage to prevent the set of ground engagement members from moving in response to omission of the set of brake release signals. Additionally, engaging the set of brakes to stop the vehicle includes withholding a set of actuation signals from the set of relays to open the set of relays and prevent the set of brake release signals from reaching the set of failsafe brake assemblies.

In some arrangements, the set of failsafe brake assemblies include:

(i) a set of spring mechanisms constructed and arranged to bias the set of failsafe brake assemblies into an engaged state, and (ii) a set of hydraulic actuators coupled with the set of spring mechanisms and the set of relays.

The set of hydraulic actuators is constructed and arranged to transition the set of failsafe brake assemblies from the engaged state to a disengaged state in response to the set of brake release signals provided through the set of relays.

In some arrangements, the vehicle further includes a set of contactors which couples with the vehicle control computer and the set of electric motors. The set of contactors is constructed and arranged to provide a set of pathways to convey the set of drive signals from the vehicle control computer to the set of electric motors. Additionally, triggering the emergency vehicle stop includes opening the set of contactors to prevent the vehicle control computer from providing the set of drive signals to the set of electric motors to move the vehicle.

In some arrangements, the set of contactors are constructed and arranged to bias to an opened state. Additionally, the method further includes, prior to triggering the emergency vehicle stop, providing a set of contactor signals to the set of contactors to transition the set of contactors from the opened state to a closed state to provide the set of pathways.

In some arrangements, triggering the emergency vehicle stop includes withholding the set of contactor signals from the set of contactors to transition the set of contactors from the closed state to the opened state to open the set of pathways.

In some arrangements, the method further includes, prior to performing the comparison operation, receiving a maximum speed command which identifies the predefined maximum speed.

In some arrangements, receiving the maximum speed command includes obtaining a switch signal from a multi-position switch. The switch signal identifies a first maximum speed when the multi-position switch is set to a first position, and a second maximum speed which is slower than the first maximum speed when the multi-position switch is set to a second position.

In some arrangements, receiving the maximum speed command includes obtaining, as the maximum speed command, a wireless signal from a wireless device that is separate from the vehicle, the wireless signal identifying the predefined maximum speed.

In some arrangements, the vehicle further includes a set of batteries constructed and arranged to provide electric power to (i) the set of electric motors to move the vehicle and (ii) the electronic safety equipment to enable the electronic safety equipment to perform the method.

In some arrangements, the vehicle further includes a controller area network (CAN) bus coupled with the vehicle control computer and the electronic safety equipment. Additionally, the method further includes, when the emergency vehicle stop is triggered, providing a set of CAN bus messages from the electronic safety equipment to the vehicle control computer to identify to the vehicle control computer that an emergency stop event has occurred.

In some arrangements, providing the set of CAN bus messages from the electronic safety equipment to the vehicle control computer includes, via the set of CAN bus messages, effectuating conveyance of a wireless communication from the vehicle control computer to a remote device that controls the vehicle, the wireless communication indicating that the emergency stop event has occurred.

Other embodiments are directed to systems, sub-systems and apparatus, assemblies, and so on. Some embodiments are directed to various installation methods, methods of use, methods of operation, mechanisms and/or componentry which are involved in controlling a vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique involves utilizing electronic safety equipment to control a vehicle such as a remotely controlled vehicle (RCV). Along these lines, the vehicle may receive normal control from a vehicle control computer. However, in the event that the current speed of the vehicle exceeds a predefined maximum speed (e.g., by a predefined amount), the electronic safety equipment triggers an emergency vehicle stop (or E-stop) which stops the vehicle. Accordingly, personnel in the vicinity are safeguarded from any malfunction or unintended operation of the vehicle. Moreover, since such triggering may occur automatically via the operation of the electronic safety equipment, there is no need for a human operator to visually deduce that the vehicle has exceeds the maximum speed before manually invoking an emergency stop.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
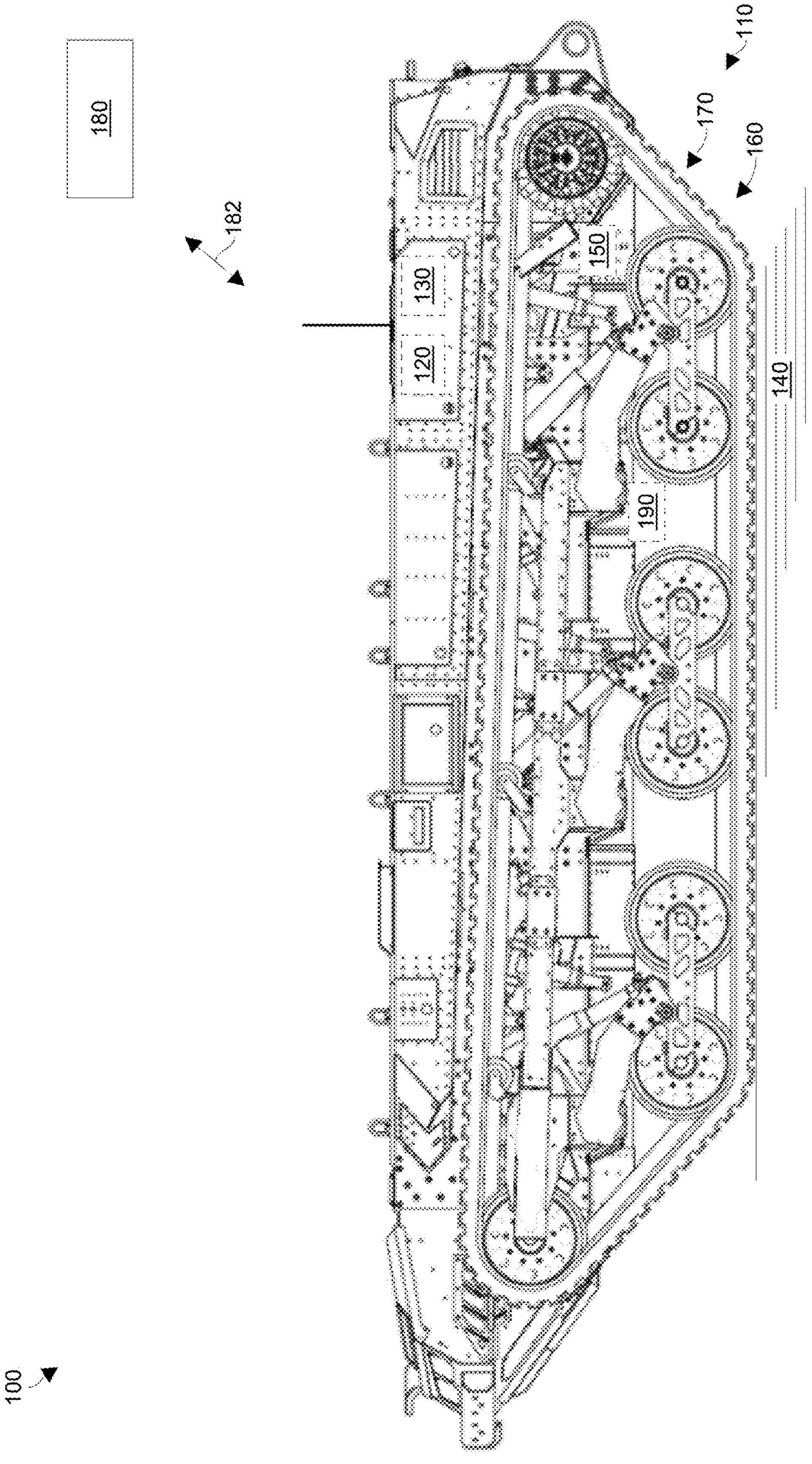
FIG. 1 is a perspective view of a vehicle which utilizes electronic safety equipment to trigger an emergency vehicle stop in accordance with certain embodiments.

FIG. 1 shows a vehicle 100 which utilizes electronic safety equipment to trigger an emergency vehicle stop in response to the current speed of the vehicle 100 exceeding a predefined maximum speed (e.g., by a predefined amount). The vehicle 100 includes, among other things, a vehicle propulsion system 110, a vehicle control computer 120, and electronic safety equipment 130.

The vehicle propulsion system 110 is constructed and arranged to move the vehicle 100 over a ground surface 140. Along these lines, the vehicle propulsion system 110 may include a set of motors 150, a set of ground engagement members 160 (e.g., tires, tracks, skis, combinations thereof, etc.), a gear box 170 that couples the set of motors 150 with the set of ground engagement members 160, and so on. It should be understood that the gear box 170 may generally refer to (or extend to) all linkage that connects the set of motors 150 with the set of ground engagement members 160 (e.g., one or more drive shafts, a transmission, a differential, combinations thereof, etc.).

The vehicle control computer 120 is coupled with the vehicle propulsion system 110, and is constructed and arranged to operate the vehicle propulsion system 110. Along these lines, the vehicle control computer 120 imposes core vehicle control over vehicle speed, vehicle direction, vehicle temperature, and so on. For example, the vehicle control computer 120 provides a set of drive signals to the set of motors 150 of the vehicle propulsion system 110 to move the vehicle 100.

The electronic safety equipment (or SSDL circuitry) 130 is coupled with the vehicle propulsion system 110 and the vehicle control computer 120, and is constructed and arranged to automatically trigger an emergency vehicle stop in response to the current speed of the vehicle 100 exceeding the predefined maximum speed (e.g., by a predefined amount). It should be appreciated that the electronic safety equipment 130 is not simply a speed limit enforcer that prevents the vehicle 100 from exceeding a speed limit (e.g., as explained above, the vehicle control computer 120 performs core vehicle control over vehicle speed). Rather, the electronic safety equipment 130 may serve as a safeguard against improper normal vehicle operation. For example, if the vehicle control computer 120 fails to impose the speed limit (e.g., due to failure of the vehicle control computer 120), the electronic safety equipment 130 brings the vehicle 100 to an emergency vehicle stop (or E-stop). Accordingly, the electronic safety equipment 130 provides an added level of protection to personnel in the area during routine vehicle operation. Moreover, the electronic safety equipment 130 is well suited for testing modifications to the vehicle control computer 120 (e.g., the electronic safety equipment 130 will automatically invoke an E-stop if any bugs/modifications/etc. prevent the vehicle control computer 120 from adhering to a programmed speed limit).

It should be understood that the speed limit imposed by the vehicle control computer 120 and the predefined maximum speed that the electronic safety equipment 130 uses as a trigger for an E-stop may be set to the same values in accordance with certain embodiments. Here, the electronic safety equipment 130 may apply a built-in margin (e.g., 3%, 5%, 10%, etc.) that vehicle 100 must surpass before triggering an E-stop. For example, if the speed limit imposed by the vehicle control computer 120 and the predefined maximum speed that the electronic safety equipment 130 uses as a trigger for an E-stop are both 3.00 miles per hour (MPH) and the built-in margin is 5%, the electronic safety equipment 130 triggers the E-stop when the vehicle speed exceeds 3.15 MPH. As another example, the margin may be a positive value (e.g., 0.1 MPH, 0.2 MPH, etc.), and so on.

It should be understood that the margin may be more complex than a simple percentage. For example, in some arrangements, the margin is a combination of percentage overrun and time, where a smaller overage is tolerated for a longer time (e.g., 0.2 s) but a larger overage is tolerated for a shorter time (e.g., 0.1 s).

As will be explained in further detail shortly, the electronic safety equipment 130 may include a maximum speed selection switch with multiple speed settings to accommodate different operating modes. For example, such operating modes may include a normal operating mode (e.g., 0 to 30 MPH), a low-speed operating mode (e.g., 0 to 3 MPH), and a very low speed operating mode (e.g., 0 to 1 MPH).

It should be understood that the vehicle 100 includes other systems, components, and so on, that may be referenced shortly. Along these lines, the vehicle 100 includes a chassis which provides support for the above-mentioned componentry, a vehicle body which may enable the vehicle 100 to carry a variety payloads (e.g., cargo, weaponry, surveillance equipment, specialized equipment, combinations therefor, etc.), a set of brakes, a control interface, and so on.

In some arrangements, the vehicle 100 is an electric remotely controlled vehicle (eRCV) which is controlled via a wireless remote device 180. Along these lines, the wireless remote device 180 is constructed and arranged to exchange wireless signals 182 with the vehicle 100 to control and monitor operation (e.g., send commands, receive status, etc.). In such arrangements, the set of motors 150 of the eRCV includes a set of electric motors and the eRCV further includes a set of batteries 190 which supplies electric power for the set of electric motors. Further details will now be provided with reference to FIG. 2.

Figure 2:
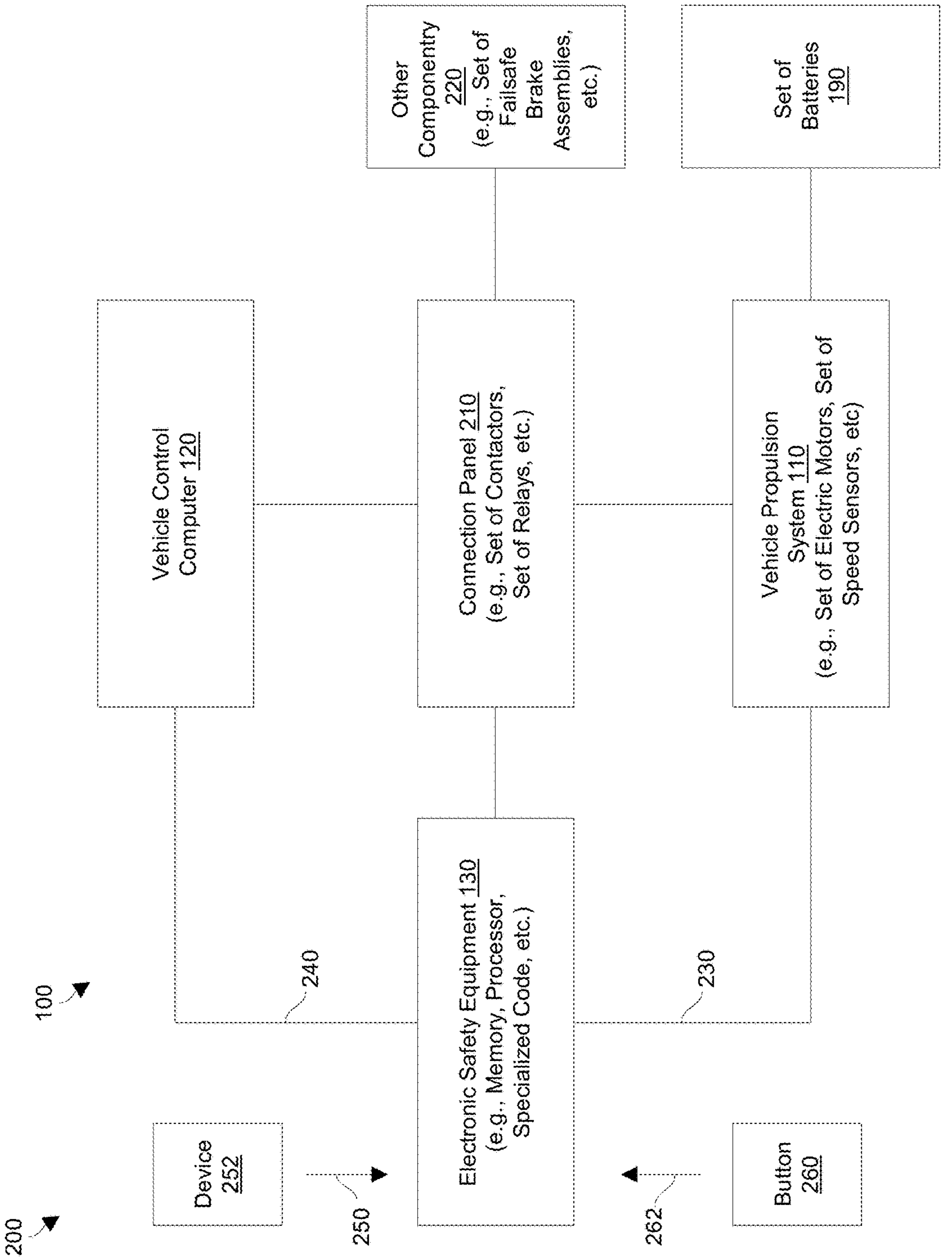
FIG. 2 is general schematic view of certain components of the vehicle in accordance with certain embodiments.

FIG. 2 is a general schematic view 200 of certain components of the vehicle 100 in accordance with certain embodiments. As shown in the schematic view 200, the vehicle control computer 120 couples with the vehicle propulsion system 110 through a connection panel 210. Accordingly and as will be explained in further detail shortly, the vehicle control computer 120 is able to provide electric power from the set of batteries 190 to a set of electric motors within the vehicle propulsion system 110 for vehicle propulsion.

As further shown in the schematic view 200, the electronic safety equipment 130 couples with the connection panel 210. Accordingly and as will be explained in further detail shortly, the electronic safety equipment 130 is able to disconnect the vehicle control computer 120 from the vehicle propulsion system 110 via the connection panel 210 when performing an emergency vehicle stop (e.g., by opening a set of contactors within the connection panel 210 to prevent electric power from the vehicle control computer 120 from reaching the set of electric motors). Furthermore, the electronic safety equipment 130 is able to prevent other componentry 220 such as a set of failsafe brake assemblies from accessing electric power from the set of batteries 190 and thus engaging when performing an emergency vehicle stop (e.g., by opening a set of relays within the connection panel 210 to prevent electric power releasing a set of spring brakes that automatically engage when electric power is cutoff).

As also shown in the general schematic view 200 of FIG. 2, the electronic safety equipment 130 may directly connect with the vehicle propulsion system 110 through a set of sensing conductors 230. Along these lines, the electronic safety equipment 130 may receive a set of speed signals from a set of sensors (e.g., a set of encoders within the gear box 160, also see FIG. 1) to ascertain the current speed of the vehicle 100. Such direct coupling through the set of sensing conductors 230 enables the electronic safety equipment 130 to acquire current vehicle speed input directly without interpretation or modification by other componentry.

Additionally, the electronic safety equipment 130 may directly connect with the vehicle control computer 120 through a communications bus 240. Along these lines, if the electronic safety equipment 130 triggers an E-stop, the electronic safety equipment 130 may provide status (e.g., notification of the E-stop) to the vehicle control computer 120 through the communications bus 240 (e.g., for conveyance to the wireless remote device 180, also see FIG. 1). In some arrangements, the electronic safety equipment 130 directly connects with the vehicle control computer 120 via a controller area network (CAN) bus to exchange messages via the CAN protocol.

As mentioned earlier, the electronic safety equipment 130 triggers the E-stop in response to the current speed of the vehicle 100 exceeding a predefined maximum speed. That is, the electronic safety equipment 130 continuously compares the current vehicle speed, as identified by a set of speed signals from the vehicle propulsion system 110, with the predefined maximum speed. If a result of comparing the current vehicle speed with the predefined maximum speed indicates that the current vehicle speed exceeds the predefined maximum speed (e.g., by a predefined amount), the electronic safety equipment 130 triggers the E-stop.

It should be understood that the electronic safety equipment 130 receives a maximum speed command 250 which identifies the predefined maximum speed prior to performing the comparisons. The maximum speed command 250 may be provided to the electronic safety equipment 130 from a device 252.

In some embodiments, the device 252 is a multi-position switch which is electrically connected to (or part of) the electronic safety equipment 130. Such a switch may have a knob (or handle) which enables a user to select a variety of switch positions corresponding to different predefined maximum speeds. For example, the multi-position switch may direct the electronic safety equipment 130 to operate in a normal operating mode which sets the predefined maximum speed to 30 MPH, a low-speed operating mode which sets the predefined maximum speed to 3 MPH, and a very low speed operating mode which sets the predefined maximum speed to 1 MPH. Along these lines, each switch position may provide a different voltage (or other type of position signal) to the electronic safety equipment 130. Other speed values are suitable for use, and other numbers of switch settings are suitable for use (e.g., two switch positions, four switch positions, and so on).

In some embodiments, the device 252 is a remote device which communicates the maximum speed command 250 to the electronic safety equipment 130 over a communications medium (e.g., wirelessly). Along these lines, the maximum speed command 250 comes in the form of a wireless signal (or transmission) and the electronic safety equipment 130 extract a particular predefined maximum speed from the wireless signal.

It should be appreciated that the ability to select different predefined maximum speeds for the enables electronic safety equipment 130 enables the vehicle 100 to continue to satisfy various standoff requirements. Along these lines, if the maximum speed is selected (e.g., 30 MPH), the vehicle 100 may have a very large safety standoff distance (e.g., over 100 feet). However, if a lower (or moderate) speed is selected (e.g., 3 MPH), the vehicle 100 may have a much lower safety standoff distance (e.g., 25 feet). Likewise, if an even lower speed is selected (e.g., 1 MPH), the vehicle 100 may have an even lower safety standoff distance (e.g., 10 feet), and so on.

In some embodiments, an E-Stop button 260 may be used by a safety operator to provide a manual emergency stop indication 262 to the electronic safety equipment 130. The E-Stop button 260 may or may not be considered part of the electronic safety equipment 130. In response to receipt of the manual emergency stop indication 262, the electronic safety equipment 130 executes an emergency vehicle stop.

It should be appreciated that a motor controller may control various operating aspects of the set of electric motors (e.g., direction, speed, acceleration/deceleration, etc.). In some arrangements, the motor controller is controlled by the vehicle control computer 120 and resides within the vehicle propulsion system 110. In other arrangements, the motor controller is not part of the vehicle propulsion system 110 (e.g., is separate from the vehicle propulsion system 110, is part of the vehicle control computer 120 to operate the set of electric motors through the connection panel 210, etc.). Further details will now be provided with reference to FIG. 3.

Figure 3:
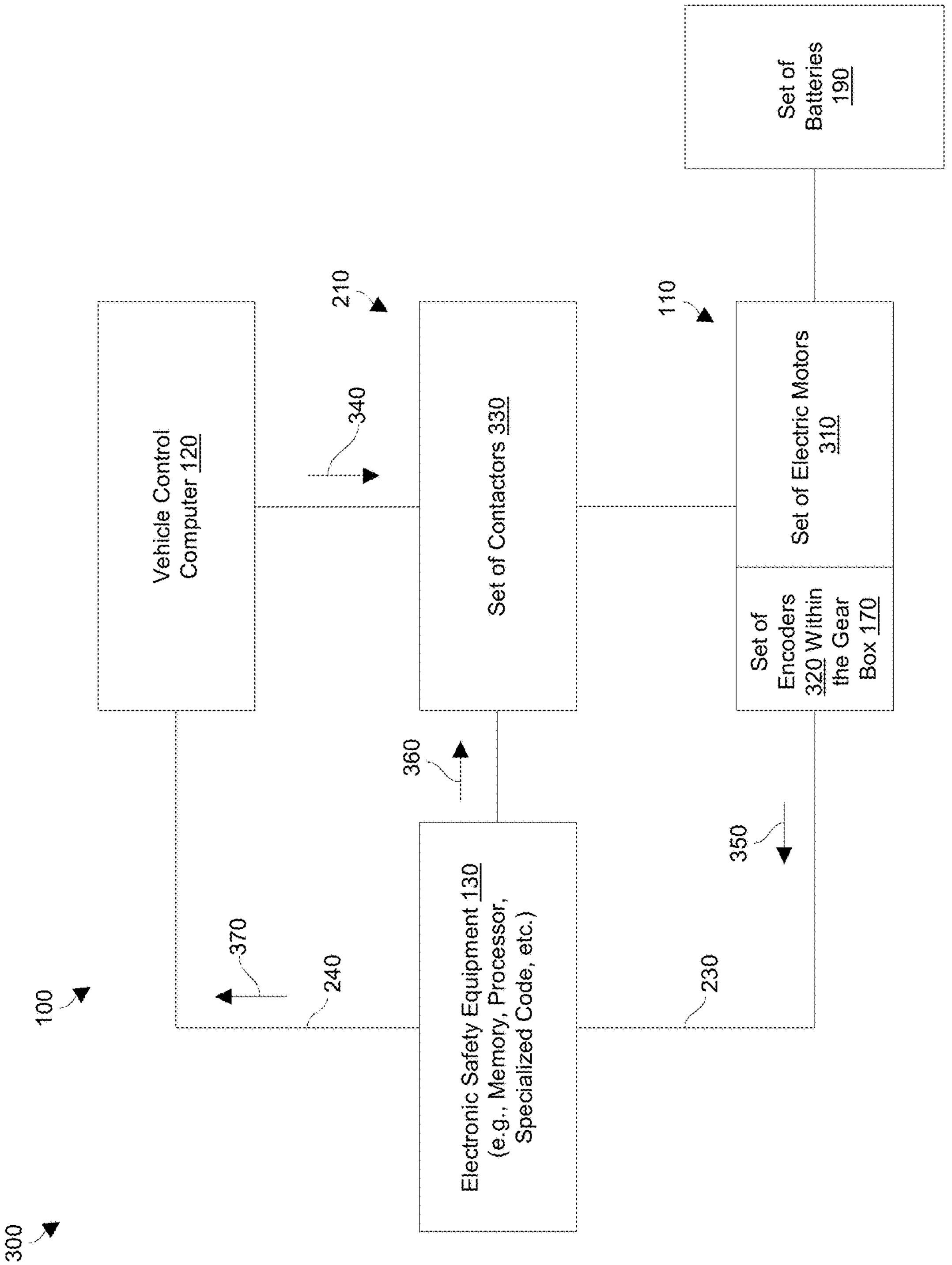
FIG. 3 is schematic view of certain components involved in performing an emergency stop involving a vehicle propulsion system in accordance with certain embodiments.

FIG. 3 is a view 300 of certain components of the vehicle 100 which are involved in performing an E-stop operation involving the vehicle propulsion system 110 in accordance with certain embodiments. As shown in FIG. 3, the vehicle propulsion system 110 includes a set of electric motors 310 and a set of encoders 320 (also see FIG. 2). Additionally, the connection panel 210 includes a set of contactors 330 which couples the vehicle control computer 120 with the set of electric motors 310.

The set of electric motors 310 is constructed and arranged to move the vehicle 100 in response to electric power from the set of batteries 190. Such electric power is provided to the set of electric motors 310 as a set of drive signals 340 from the vehicle control computer 120.

The set of encoders 320 is constructed and arranged to provide a set of encoder signals 350 to the electronic safety equipment 130. The set of encoder signals 350 identifies the current speed of the vehicle 100. In some arrangements, the set of encoders 320 resides within the gear box 170 and continuously provides the set of encoder signals 350 to the electronic safety equipment 130 through the set of sensor conductors 230.

The set of contactors 330 is constructed and arranged to accommodate high current suitable for the set of drive signals 340 from the vehicle control computer 120. Along these lines, the set of contactors 330 resides in a closed state which provides a set of pathways to convey the set of drive signals 340 from the vehicle control computer 120 to the set of electric motors 310 when the electronic safety equipment 130 provides a set of contactor signals 360 to the set of contactors 330. Additionally, the set of contactors 330 resides in an opened state which disconnects the vehicle control computer 120 from the set of electric motors 310 when the electronic safety equipment 130 no longer provides the set of contactor signals 360 to the set of contactors 330.

During routine operation, the electronic safety equipment 130 provides the set of contactor signals 360 to the set of contactors 330. In response, the set of contactors 330 close thus providing the set of pathways. Accordingly, the vehicle control computer 120 is able to provide the set of drive signals 340 to the set of electric motors 310 to move the vehicle 100.

During such operation, the electronic safety equipment 130 continuously monitors the current vehicle speed and compares the current vehicle speed with the predefined maximum speed. As long as the current vehicle speed is less than or equal to the predefined maximum speed, the electronic safety equipment 130 continues to provide the set of contactor signals 360 to the set of contactors 330. As a result, the set of contactors 330 remains closed to provide the set of pathways, and the vehicle control computer 120 is able to provide the set of drive signals 340 to the set of electric motors 310 to move the vehicle 100.

However, if a result of the comparison between the current vehicle speed and the predefined maximum speed indicates that the current vehicle speed is greater than the predefined maximum speed (e.g., by a predefined amount), the electronic safety equipment 130 triggers an E-stop. In particular, the electronic safety equipment 130 stops providing the set of contactor signals 360 to the set of contactors 330. Accordingly, the set of contactors 330 opens to remove the set of pathways. As a result, the set of electric motors 310 is no longer able to receive the set of drive signals 340 from the vehicle control computer 120 and thus no longer moves the vehicle 100.

In some arrangements, the set of contactor signals 360 may be considered as always being provided (or applied). For example, the set of contactor signals 360 may be considered to have an asserted state when power is provided to close the set of contactors 330, and a de-asserted state when there is no power provided to close the set of contactors 330.

In some arrangements, the electronic safety equipment 130 sends a set of signals 370 (e.g., a set of CAN bus messages) to the vehicle control computer 120 through the communications bus 240. The set of signals 370 informs the vehicle control computer 120 that an emergency stop event has occurred. Further details will now be provided with reference to FIG. 4.

Figure 4:
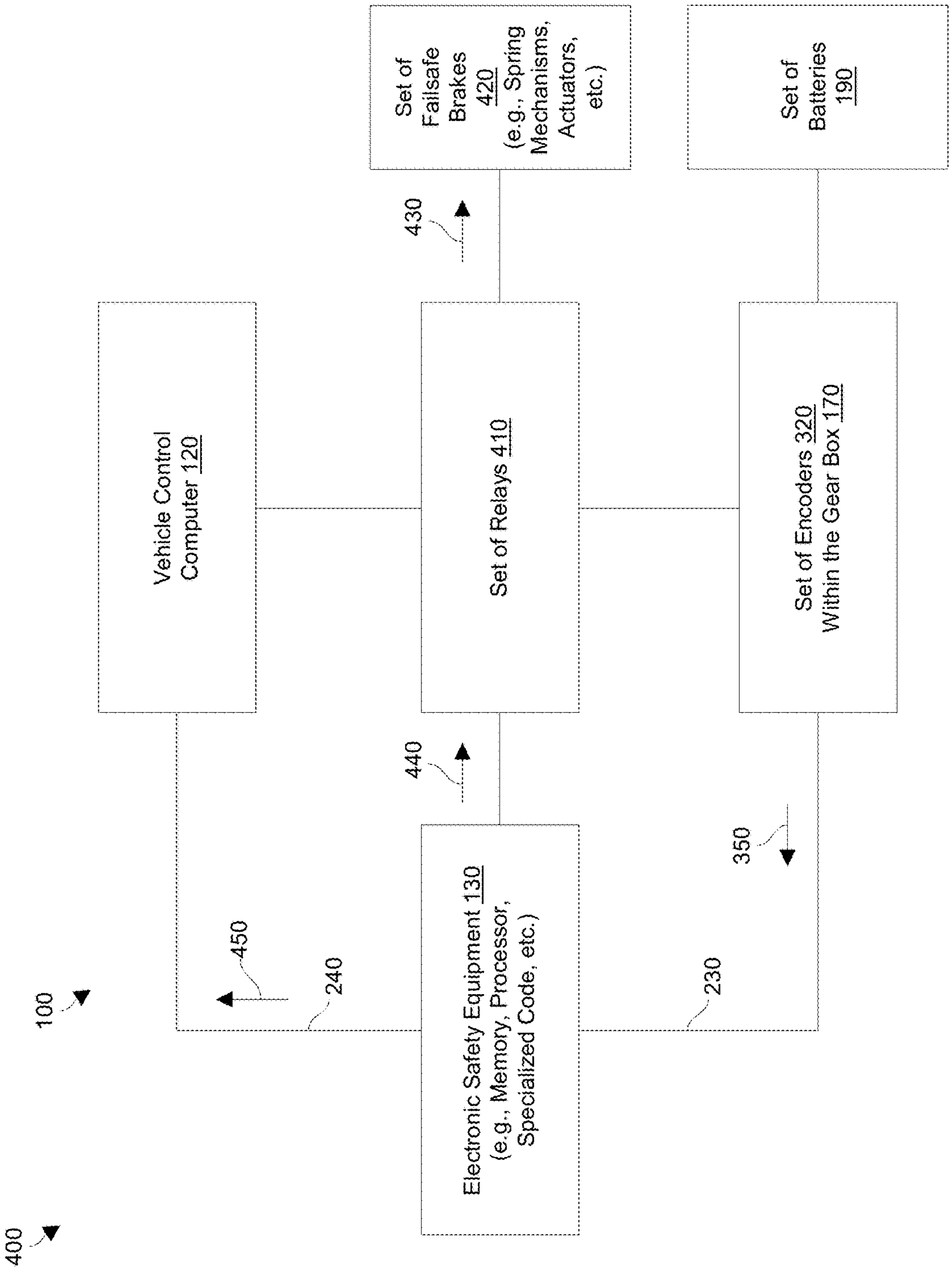
FIG. 4 is schematic view of certain components involved in performing an emergency stop involving vehicle brakes in accordance with certain embodiments.

FIG. 4 is a view 400 of certain components of the vehicle 100 which are involved in performing an E-stop operation involving vehicle brakes in accordance with certain embodiments. As shown in FIG. 4, the vehicle 100 includes a set of brakes 420 (also see the other componentry 220 in FIG. 2). Additionally, the connection panel 210 includes a set of relays 410 which couples the vehicle control computer 120 with the set of brakes 420. Furthermore, as mentioned earlier in connection with FIG. 3, the vehicle propulsion system 110 includes a set of encoders 320 within the gear box 170.

The set of brakes 420 couples with the set of ground engagement members 160 and is constructed and arranged to stop and hold the vehicle 100 in place over the ground surface 140 when applied (also see FIG. 1). Along these lines, when the set of brakes 420 is in a released state, the set of ground engagement members 160 are able to turn freely. However, when the set of brakes 420 is in an engaged state, the set of brakes 420 inhibit the set of ground engagement members 160 from moving thus slowing and stopping the vehicle 100.

In further detail, the set of brakes 420 includes a set of failsafe brake assemblies (or simply spring brakes) which have a set of spring mechanisms constructed and arranged to bias the set of failsafe brake assemblies into an engaged state. Additionally, the set of failsafe brake assemblies includes a set of hydraulic (or electric) actuators coupled with the set of spring mechanisms and the set of relays 410.

The set of relays 410 is constructed and arranged to control delivery of a set of brake release signals 430 from the set of batteries 190 (e.g., via the vehicle control computer 120) to the set of hydraulic actuators to disengage the set of failsafe brakes 420. Along these lines, when the electronic safety equipment 130 provides a set of actuation signals 440 to the set of relays 410 to close of the set of relays 410, the set of relays 410 provides the set of brake release signals 430 to the set of failsafe brakes 420 to release the set of failsafe brakes 420. Accordingly, the set of hydraulic actuators provides pressure to the set of spring mechanisms to release the brakes. As a result, the vehicle control computer 120 is able to operate the vehicle propulsion system 110 to move the vehicle 100.

However, when the electronic safety equipment 130 withholds the set of actuation signals 440 from the set of relays 410 to open the set of relays 410, the set of relays 410 no longer provides the set of brake release signals 430 to the set of failsafe brakes 420. Accordingly, the set of hydraulic actuators no longer pressure to the set of spring mechanisms, and the set of failsafe brakes 420 engage.

During routine operation, the electronic safety equipment 130 provides the set of actuation signals 440 to the set of relays 410. In response, the set of relays 410 close thus providing the set of brake release signals 430 to the set of failsafe brakes 420. Accordingly, the set of failsafe brakes 420 does not hold the set of ground engagement members 160 in place.

During such operation, the electronic safety equipment 130 continuously monitors the current vehicle speed and compares the current vehicle speed with the predefined maximum speed. As long as the current vehicle speed is less than or equal to the predefined maximum speed, the electronic safety equipment 130 continues to provide the set of actuation signals 440 to the set of relays 410. As a result, the set of failsafe brakes 420 remains disengaged.

However, if a result of the comparison between the current vehicle speed and the predefined maximum speed indicates that the current vehicle speed is greater than the predefined maximum speed (e.g., by a predefined amount), the electronic safety equipment 130 triggers an E-stop. In particular, the electronic safety equipment 130 stops providing the set of actuation signals 440 to the set of relays 410. Accordingly, the set of relays 410 preventing the set of brake release signals 430 from reaching the set of failsafe brakes 420. As a result, the set of actuators no longer actuate the set of spring mechanisms and the set of spring mechanisms bias to the engaged state to slow and stop the vehicle 100.

In some arrangements, the set of actuation signals 440 may be considered as always being provided (or applied). For example, the set of actuation signals 440 may be considered to have an asserted state when power is provided to close the set of relays 410, and a de-asserted state when there is no power provided to close the set of relays 410.

In some arrangements, the electronic safety equipment 130 sends a set of signals 450 (e.g., a set of CAN bus messages) to the vehicle control computer 120 through the communications bus 240. The set of signals 450 informs the vehicle control computer 120 that an emergency stop event has occurred.

It should be understood that the presence of the electronic safety equipment 130 enables the vehicle 100 to enjoy certain advantages. For example, suppose that the vehicle control computer 120 has undergone certain changes or upgrades. Since the electronic safety equipment 130 is separate from the vehicle control computer 120, if the vehicle control computer 120 operates in an unexpected manner such as inadvertently exceeding the maximum speed (e.g., due to a hidden programming error, a defect, etc.), the electronic safety equipment 130 is there to perform an emergency stop thus preventing the vehicle 100 from injuring personnel. Further details will now be provided with reference to FIG. 5.

Figure 5:
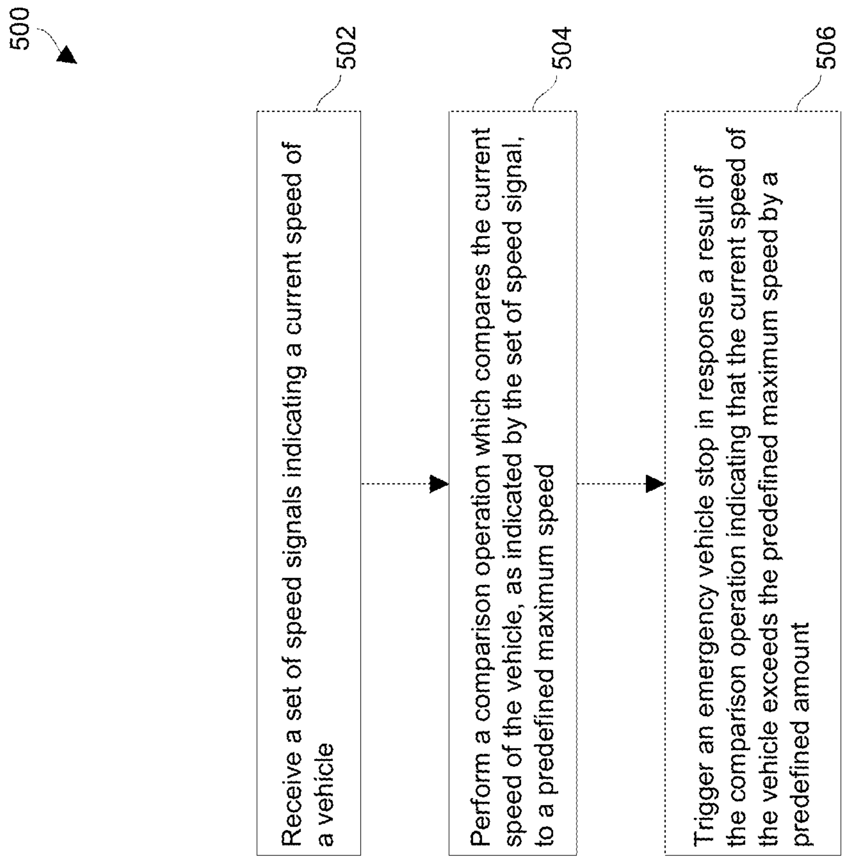
FIG. 5 is a flowchart of a procedure to control a vehicle in accordance with certain embodiments.

FIG. 5 is a flowchart for a procedure 500 to control a vehicle in accordance with certain embodiments. The procedure 500 may be performed by specialized circuitry (or SSDL), e.g., memory storing specialized instructions, and processing circuitry coupled with the memory to carry out the specialized instructions.

At 502, the specialized circuitry receives a set of speed signals indicating a current speed of the vehicle. It should be understood that the specialized circuitry may serve as a safeguard against failures in a vehicle control computer which provides normal control over the vehicle's propulsion system (e.g., routine speed control).

At 504, the specialized circuitry performs a comparison operation which compares the current speed of the vehicle, as indicated by the set of speed signals, to a predefined maximum speed. For example, the specialized circuitry may receive a set of encoder signals from a set of encoders within the vehicle's gear box.

At 506, the specialized circuitry triggers an emergency vehicle stop in response to a result of the comparison operation indicating that the current speed of the vehicle exceeds the predefined maximum speed by a predefined amount. Here, it may be assumed that the vehicle's control computer was unable to maintain the speed of the vehicle under the predefined maximum speed. Accordingly, the specialized circuitry performs an E-stop.

The predefined amount may be zero. However, in some embodiments, the predefined amount is greater than zero such as a percentage of the predefined maximum speed (e.g., 3%, 5%, etc.) or a value (e.g., 0.1 MPH, 0.2 MPH, etc.), and so on.

Those skilled in the art will therefore understand that various changes in form and detail may be made to the embodiments disclosed herein without departing from the scope of the disclosure.

For example, the electronic safety equipment 130 was described above as receiving a set of speed signals from a set of encoders 320 within a gear box 170 by way of example only. Other configurations, devices, mechanisms, approaches, locations, etc. may be employed to enable the electronic safety equipment 130 to monitor vehicle speed. Such alternative apparatus, methods, variations, etc. are suitable for use by the techniques disclosed herein.

It should be understood that the specialized circuitry is constructed and arranged to continue receiving the set of speed signals (502) and performing new comparison operations (504) over time. As long as the current speed does not exceed the predefined maximum speed by the predefined amount, the specialized circuitry does not trigger the emergency vehicle stop (506). However, if the specialized circuitry does detect that the current speed exceeds the predefined maximum speed by the predefined amount, the specialized circuitry triggers the emergency vehicle stop.

As described above, an improved technique involves utilizing electronic safety equipment 130 to control a vehicle 100 such as a RCV. Along these lines, the vehicle 100 may receive normal control from a vehicle control computer 120. However, in the event that the current speed of the vehicle 100 exceeds a predefined maximum speed (e.g., by a predefined amount), the electronic safety equipment 130 triggers an emergency vehicle stop which stops the vehicle 100. Accordingly, personnel in the vicinity are safeguarded from any malfunction or unintended operation of the vehicle 100. Moreover, since such triggering may occur automatically via the operation of the electronic safety equipment 130, there is no need for a human operator to visually deduce that the vehicle 100 has exceeds the maximum speed before manually invoking an emergency stop.

In accordance with certain embodiments, various improvements disclosed herein are suitable for a variety of vehicles. Examples of such vehicles include a heavy RCV such as a tactical (or military) vehicle.

Such an RCV may include two heavy-duty, high-power (e.g., 600 HP) electric motors as prime movers, along with associated gearboxes each having a speed encoder providing an indication of vehicle speed. The RCV may further include two sets of spring brakes that provide braking for the vehicle. The brakes may be of a fail-safe type such as found on large commercial trucks for example, in which the spring brakes act to stop the vehicle unless there is adequate hydraulic pressure to counteract their operation and enable vehicle movement.

Control components include a vehicle control computer (VCC), vehicle safety circuitry (VSC) and safety standoff distance limiter (SSDL). The electronic safety equipment 130 may serve as a suitable SSDL (also see FIG. 2). An E-Stop button may be used by a safety operator to provide a manual emergency stop indication to the SSDL (e.g., see the device 260 in FIG. 2). A max speed select switch is used to select a maximum speed to be enforced (e.g., see the device 252 in FIG. 2).

In one embodiment, the selections provided by the max speed select switch may correspond to three distinct operating modes with corresponding standoff distances:

1. Normal operation (e.g., unlimited or very high limit such as 30 MPH)
2. Low-speed operation (e.g., 3 MPH)
3. Very low speed operation (e.g., 1 MPH or less)

The low-speed and very low-speed settings can be used for operations such as transport loading, maintenance, etc. The SSDL operates to enforce the selected maximum speed. When the vehicle is operating with the high-speed setting, a correspondingly high safety standoff distance is required, such as over 100 feet as described above. When the vehicle is operating with the low-speed or very low-speed setting, a correspondingly lower safety standoff distance may be observed, such as 10 feet or less for example.

In accordance with certain embodiments, the VCC is a computerized component executing core vehicle operating software to serve as the primary controller for all vehicle functions, including regular operating functions and safety-related functions. It includes a collection of applications that provides the core vehicle control running on top of a hardened operating system.

In accordance with certain embodiments, the VSC provides all lower-level control required to execute an emergency stop, as signaled by the SSDL, and transition the vehicle into a safe condition. It includes an array of heavy-duty 28V relays that are triggered to disable various operating electrical signals, such as the drive signals for the generators for example. The VSC preferably has a dual redundant organization to protect against single failures of internal components.

In one embodiment, the SSDL is also a computerized component executing operating software. For example, it may be realized using a heavy-duty automotive safety processor of the type generally known, for example as conventionally used for controlling anti-lock brakes. It may of course be realized in different ways, including possibly using purpose-built circuitry not necessarily processor-based. As noted, the SSDL is preferably designed in a fail-safe manner such that an internal failure results in assertion of the E-stop signal to the VCS. In a 28V system, for example, the E-stop signal corresponds to the absence of 28V on the signal line.

The SSDL may be incorporated into existing vehicle safety circuitry. In one embodiment it requires speed encoders, which may be located in the gearbox(s), to allow for speed tracking of the vehicle into the safety processor. The safety processor utilizes a companion microprocessor (or watchdog circuitry) to monitor safety critical inputs and ensure system functionality as may be required for safety certification (e.g., ASIL-D) for example. Status to the SSDL can be monitored by the VCC over a signaling connection such as a controller area networking (CAN) bus. It is emphasized that the SSDL is separate from the VCC which provides for speed control during normal operation, because in part the SSDL protects against failure of that normal speed control circuitry that could otherwise result in unsafe conditions when reduced standoff distance is being observed.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

While various embodiments of the present disclosure have been particularly shown and described, it will be understood by those skilled in the art that various changes in form and details may be made therein without departing from the spirit and scope of the present disclosure as defined by the appended claims. Such modifications and enhancements are intended to belong to various embodiments of the disclosure.

What is claimed is:

1. A remotely controlled vehicle, comprising:

a vehicle propulsion system constructed and arranged to move the remotely controlled vehicle;

a vehicle control computer coupled with the vehicle propulsion system, the vehicle control computer being constructed and arranged to operate the vehicle propulsion system; and electronic safety equipment coupled with the vehicle propulsion system, the electronic safety equipment being constructed and arranged to perform a method of:

receiving a set of speed signals indicating a current speed of the remotely controlled vehicle, performing a comparison operation which compares the current speed of the remotely controlled vehicle, as indicated by the set of speed signals, to a predefined maximum speed, and triggering an emergency vehicle stop in response to a result of the comparison operation indicating that the current speed of the remotely controlled vehicle exceeds the predefined maximum speed by a predefined amount;

wherein the remote controlled vehicle further comprises:

a controller area network (CAN) bus coupled with the vehicle control computer and the electronic safety equipment; and wherein the method further includes:

when the emergency vehicle stop is triggered, providing a set of CAN bus messages from the electronic safety equipment to the vehicle control computer to identify to the vehicle control computer that an emergency stop event has occurred.

2. The remotely controlled vehicle of claim 1 wherein the vehicle propulsion system includes:

a set of electric motors constructed and arranged to move the remotely controlled vehicle in response to a set of drive signals;

wherein the vehicle control computer is constructed and arranged to provide the set of drive signals to the set of electric motors to move the remotely controlled vehicle;

wherein the remotely controlled vehicle further comprises a set of sensors; and wherein receiving the set of speed signals indicating the current speed of the remotely controlled vehicle includes:

sensing the set of speed signals from the set of sensors while the vehicle control computer provides the set of drive signals to the set of electric motors to move the remotely controlled vehicle.

3. The remotely controlled vehicle of claim 2 wherein the vehicle propulsion system further includes:

a set of ground engagement members, and a gear box which couples the set of electric motors with the set of ground engagement members;

wherein the set of sensors includes a set of encoders disposed within the gear box; and wherein sensing the set of speed signals from the set of sensors includes:

acquiring, as at least a portion of the set of speed signals, a set of encoder signals from the set of encoders.

4. The remotely controlled vehicle of claim 3, further comprising:

a set of brakes which couples with the set of ground engagement members; and wherein triggering the emergency vehicle stop includes:

engaging the set of brakes to stop the remotely controlled vehicle.

5. The remotely controlled vehicle of claim 4 wherein the set of brakes includes a set of failsafe brake assemblies constructed and arranged to (i) release to allow the set of ground engagements members to move in response to a set of brake release signals provided through a set of relays and (ii) engage to prevent the set of ground engagement members from moving in response to omission of the set of brake release signals; and wherein engaging the set of brakes to stop the remotely controlled vehicle includes:

withholding a set of actuation signals from the set of relays to open the set of relays and prevent the set of brake release signals from reaching the set of failsafe brake assemblies.

6. The remotely controlled vehicle of claim 5 wherein the set of failsafe brake assemblies include:

a set of spring mechanisms constructed and arranged to bias the set of failsafe brake assemblies into an engaged state, and a set of hydraulic actuators coupled with the set of spring mechanisms and the set of relays, the set of hydraulic actuators being constructed and arranged to transition the set of failsafe brake assemblies from the engaged state to a disengaged state in response to the set of brake release signals provided through the set of relays.

7. The remotely controlled vehicle of claim 3, further comprising:

a set of contactors which couples with the vehicle control computer and the set of electric motors, the set of contactors being constructed and arranged to provide a set of pathways to convey the set of drive signals from the vehicle control computer to the set of electric motors; and wherein triggering the emergency vehicle stop includes:

opening the set of contactors to prevent the vehicle control computer from providing the set of drive signals to the set of electric motors to move the remotely controlled vehicle.

8. The remotely controlled vehicle of claim 7 wherein the set of contactors are constructed and arranged to bias to an opened state; and wherein the method further includes:

prior to triggering the emergency vehicle stop, providing a set of contactor signals to the set of contactors to transition the set of contactors from the opened state to a closed state to provide the set of pathways.

9. The remotely controlled vehicle of claim 8 wherein triggering the emergency vehicle stop includes:

withholding the set of contactor signals from the set of contactors to transition the set of contactors from the closed state to the opened state to open the set of pathways.

10. The remotely controlled vehicle of claim 1 wherein the method further includes:

prior to performing the comparison operation, receiving a maximum speed command which identifies the predefined maximum speed.

11. The remotely controlled vehicle of claim 10 wherein receiving the maximum speed command includes:

obtaining a switch signal from a multi-position switch, the switch signal identifying a first maximum speed when the multi-position switch is set to a first position, and a second maximum speed which is slower than the first maximum speed when the multi-position switch is set to a second position.

12. The remotely controlled vehicle of claim 10 wherein receiving the maximum speed command includes:

obtaining, as the maximum speed command, a wireless signal from a wireless device that is separate from the remotely controlled vehicle, the wireless signal identifying the predefined maximum speed.

13. The remotely controlled vehicle of claim 2, further comprising:

a set of batteries constructed and arranged to provide electric power to (i) the set of electric motors to move the remotely controlled vehicle and (ii) the electronic safety equipment to enable the electronic safety equipment to perform the method.

14. The remotely controlled vehicle of claim 1 wherein providing the set of CAN bus messages from the electronic safety equipment to the vehicle control computer includes:

via the set of CAN bus messages, effectuating conveyance of a wireless communication from the vehicle control computer to a remote device that controls the remotely controlled vehicle, the wireless communication indicating that the emergency stop event has occurred.

15. Electronic safety equipment to control a vehicle, the electronic safety equipment comprising:

memory; and processing circuitry coupled with the memory, the memory storing instructions which, when carried out by the processing circuitry, cause the processing circuitry to perform a method of:

receiving a set of speed signals indicating a current speed of the vehicle, performing a comparison operation which compares the current speed of the vehicle, as indicated by the set of speed signals, to a predefined maximum speed, and triggering an emergency vehicle stop in response to a result of the comparison operation indicating that the current speed of the vehicle exceeds the predefined maximum speed by a predefined amount;

wherein the vehicle includes:

a set of electric motors constructed and arranged to move the vehicle in response to a set of drive signals, a vehicle control computer coupled with the set of electric motors, the vehicle control computer being constructed and arranged to provide the set of drive signals to the set of electric motors to move the vehicle, and a controller area network (CAN) bus coupled with the vehicle control computer and the electronic safety equipment; and wherein the method further includes:

when the emergency vehicle stop is triggered, providing a set of CAN bus messages from the electronic safety equipment to the vehicle control computer to identify to the vehicle control computer that an emergency stop event has occurred.

16. Electronic safety equipment as in claim 15 wherein the vehicle further includes:

a set of brakes which couples with the set of ground engagement members; and wherein triggering the emergency vehicle stop includes: engaging the set of brakes to stop the vehicle.

17. Electronic safety equipment as in claim 16 wherein the vehicle further includes:

a set of contactors which couples with the vehicle control computer and the set of electric motors, the set of contactors being constructed and arranged to provide a set of pathways to convey the set of drive signals from the vehicle control computer to the set of electric motors; and wherein triggering the emergency vehicle stop further includes:

opening the set of contactors to prevent the vehicle control computer from providing the set of drive signals to the set of electric motors to move the vehicle.

18. A method of controlling a vehicle, the method comprising:

receiving a set of speed signals indicating a current speed of the vehicle;

performing a comparison operation which compares the current speed of the vehicle, as indicated by the set of speed signals, to a predefined maximum speed; and triggering an emergency vehicle stop in response to a result of the comparison operation indicating that the current speed of the vehicle exceeds the predefined maximum speed by a predefined amount;

wherein the vehicle includes:

a set of electric motors constructed and arranged to move the vehicle in response to a set of drive signals, a vehicle control computer coupled with the set of electric motors, the vehicle control computer being constructed and arranged to provide the set of drive signals to the set of electric motors to move the vehicle, and a controller area network (CAN) bus coupled with the vehicle control computer and the electronic safety equipment; and wherein the method further includes:

when the emergency vehicle stop is triggered, providing a set of CAN bus messages from the electronic safety equipment to the vehicle control computer to identify to the vehicle control computer that an emergency stop event has occurred.

19. The method as in claim 18, wherein performing the comparison operation includes:

applying a built-in margin to the predefined maximum speed to detect whether the current speed of the vehicle exceeded the predefined maximum speed by the predefined amount.

* * * * *